(12) United States Patent
Deo et al.

(10) Patent No.: US 6,975,632 B2
(45) Date of Patent: Dec. 13, 2005

(54) MULTI-SERVICE ARCHITECTURE WITH ANY PORT ANY SERVICE (APAS) HARDWARE PLATFORM

(75) Inventors: Satish D. Deo, San Jose, CA (US); Pankaj S. Patel, Cupertino, CA (US); Shirish K. Sathe, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/270,297

(22) Filed: Mar. 15, 1999

(65) Prior Publication Data

US 2003/0128715 A1 Jul. 10, 2003

(51) Int. Cl.$^7$ .............................. H04L 12/28; H04J 3/16
(52) U.S. Cl. ....................... 370/401; 370/419; 370/466
(58) Field of Search ................................ 370/352–360, 370/375, 401, 395, 442, 465–469, 419, 463; 709/226

(56) References Cited

U.S. PATENT DOCUMENTS

| | | | |
|---|---|---|---|
| 3,889,054 | A | 6/1975 | Nagel et al. |
| 4,042,958 | A | 8/1977 | Saylor et al. |
| 4,054,911 | A | 10/1977 | Fletcher et al. |
| RE31,863 | E | 4/1985 | Saylor et al. |
| 5,003,591 | A | 3/1991 | Kauffman et al. |

(Continued)

FOREIGN PATENT DOCUMENTS

| | | |
|---|---|---|
| EP | 0 505 884 A2 | 3/1992 |
| EP | 0 505 884 A3 | 9/1992 |
| EP | 0713310 A2 | 5/1996 |
| GB | 2 200 816 A | 8/1988 |
| WO | WO 94/16528 | 7/1994 |
| WO | 0713310 A2 | 8/1996 |
| WO | WO 97/29563 | 8/1997 |
| WO | WO 97/31441 | 8/1997 |
| WO | WO 97/31441 A1 | 8/1997 |

OTHER PUBLICATIONS

"Motorola Announces New, Higher Performance Versions Of Its Popular MPC860 PowerQUICCTM Microprocessors" Website,http://apspg.motorola.com/press/press/042999/powerquicc.html, 3 pages.

MOTOROLA "MPC860 PowerQUICC Technical Summary", MPC860TS/D, Rev. 0.1, Sections 1.1–1.8, Nov. 2001, pp. 1–9.

IBM Technical Disclosure Bulletin, "Task Management Of Multiple Digital Signal Processors"vol. 34, No. 7B, Dec. 1991, pp. 237–239.

"Motorola Announces New, Higher Performance Versions Of Its Popular MPC860 PowerQUICCTM Microprocessors" Press Release, Apr. 28, 1999 , Website,http://apspg-.motorola.com/press/press/042999/powerquicc.html, 3 pages.

Motorola Semiconductor Product Summary Page re MPC860: PowerQUICC; Integrated PowerPC Microprocessor; Oct. 23, 2000; http://ebus.mot–sps.com/ProdCat/psp/0, 1250,MPC860~M98655,00.html.

(Continued)

Primary Examiner—Andy Lee
(74) Attorney, Agent, or Firm—Blakely, Sokoloff, Taylor & Zafman LLP (57) ABSTRACT

An apparatus for a multi-service network architecture for processing network traffic arriving on a network connection is disclosed. The multi-service network architecture has a plurality of network connection components residing on a single platform and a processor coupled to the network connection components. The processor is configured to execute a predetermined one of a plurality of software images corresponding to the type of network traffic arriving on the network connection and to selectively enable at least one of the network connection components according to the predetermined software image.

44 Claims, 6 Drawing Sheets

U.S. PATENT DOCUMENTS

| | | | |
|---|---|---|---|
| 5,133,081 A | | 7/1992 | Mayo |
| 5,142,528 A | * | 8/1992 | Kobayashi et al. .......... 370/469 |
| 5,365,590 A | * | 11/1994 | Brame ........................ 455/552 |
| 5,367,678 A | | 11/1994 | Lee et al. |
| 5,388,102 A | * | 2/1995 | Griffith et al. .............. 370/375 |
| 5,436,955 A | | 7/1995 | Kaewell, Jr. et al. |
| 5,440,740 A | | 8/1995 | Chen et al. |
| 5,467,286 A | | 11/1995 | Pyle et al. |
| 5,479,407 A | | 12/1995 | Ko et al. |
| 5,490,252 A | * | 2/1996 | Macera et al. .............. 370/401 |
| 5,497,373 A | * | 3/1996 | Hulen et al. ................ 370/419 |
| 5,521,914 A | * | 5/1996 | Mavraganis et al. ........ 370/352 |
| 5,625,845 A | | 4/1997 | Allran et al. |
| 5,682,484 A | | 10/1997 | Lambrecht |
| 5,748,468 A | | 5/1998 | Notenboom et al. |
| 5,787,149 A | | 7/1998 | Yousefi et al. |
| 5,841,991 A | | 11/1998 | Russell |
| 5,880,720 A | | 3/1999 | Iwafune et al. |
| 5,946,634 A | * | 8/1999 | Korpela ...................... 455/552 |
| 5,982,783 A | | 11/1999 | Frey et al. |
| 5,991,299 A | * | 11/1999 | Radogna et al. ............ 370/392 |
| 6,002,689 A | | 12/1999 | Christie et al. |
| 6,026,086 A | * | 2/2000 | Lancelot et al. ............ 370/353 |
| 6,040,829 A | | 3/2000 | Croy et al. |
| 6,041,058 A | * | 3/2000 | Flanders et al. ............ 370/401 |
| 6,052,145 A | | 4/2000 | Macrae et al. |
| 6,104,721 A | | 8/2000 | Hsu |
| 6,122,232 A | | 9/2000 | Schell et al. |
| 6,128,293 A | * | 10/2000 | Pfeffer ........................ 370/359 |
| 6,160,545 A | | 12/2000 | Eyer et al. |
| 6,161,008 A | | 12/2000 | Lee et al. |
| 6,202,090 B1 | * | 3/2001 | Simone ...................... 709/226 |
| 6,269,095 B1 | | 7/2001 | Neubauer et al. |
| 2002/0110111 A | | 8/1995 | Couture |

OTHER PUBLICATIONS

PCT Search Report mailed Oct. 10, 2000 for International Application No. PCT/US00/06982, from the International Searching Authority, 7 pages.

PCT Written Opinion for International application No. PCT/US00/06982, mailed Apr. 11, 2001, from the International Preliminary Examining Authority, 4 pages.

PCT Search Report mailed Oct. 10, 2000 for International Application No. PCT/US00/06982, from the International Searching Authority, 7 pages.

PCT Written Opinion for International application No. PCT/US00/06982, mailed Apr. 11, 2001, from the International Preliminary Examining Authority, 4 pages.

Motorola Semiconductor Product Summary Page re MPC860: PowerQUICC; Integrated PowerPC Microprocessor; Oct. 23, 2000; http://ebus.mot–sps.com/ProdCat/psp/0,1250,MPC860~M98655.00.html.

* cited by examiner

MULTI-SERVICE ARCHITECTURE WITH ANY PORT ANY SERVICE (APAS) HARDWARE PLATFORM

FIELD OF THE INVENTION

The present invention is related to the field of network architecture, more specifically, the method and apparatus of the present invention is a multi-service architecture with "Any Port Any Service" (APAS) hardware platform.

BACKGROUND

In general, a network switch provides a data path, or interface, between networks and is a device that allows a connection to be established as necessary and terminated when there is no longer a session to support. A typical network switch is part of a network equipment such as a modular multi-service access concentrator (MAC) implemented in a multi-slot box chassis with a number of hardware boards with digital signal processors (DSPs). Each hardware board may have a set of port connectors that is wired or connected to a Public Branch Exchange (PBX) or some network level application.

A given network may operate according to a particular networking standard protocol and a typical network switch is designed to support a network application of a single networking standard protocol. Examples of networking standard protocols that may be supported by different network switches include, but are not limited to, Frame Relay, voice, circuit emulation, T1 channelized, E1 channelized, and Asynchronous Transfer Mode (ATM).

For example, a hardware board supporting a 'Voice' application may have a network switch that is connected to T1/E1 Framers and Digital Signal Processor Modules (DSPMs) specifically to support 'Voice' applications. A hardware board supporting an 'ATM' application may have a network switch that connects T1/E1 Framers to Serial Communication Controllers (SCCs) on processors specifically to support an 'ATM' application. Thus a hardware board with a typical network switch only supports a specific pre-defined network application.

The disadvantages of the current technology are many. For example, because a hardware board with a network switch designed for a given network application is only capable of supporting that network application, different hardware boards are required to support different network applications (e.g. Voice, ATM, Frame Relay). This multiplies the efforts in development, testing, integration and support of a network product. Additionally, current technology leads to greater inventory for a service provider because a service provider must keep in stock a sufficient number of hardware boards of different support capabilities.

BRIEF SUMMARY OF THE INVENTION

An apparatus for a multi-service network architecture for processing network traffic arriving on a network connection is disclosed. The multi-service network architecture has a plurality of network connection components residing on a single platform and a processor coupled to the network connection components. The processor is configured to execute a predetermined one of a plurality of software images corresponding to the type of network traffic arriving on the network connection and to selectively enable at least one of the network connection components according to the predetermined software image.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements in which.

DETAILED DESCRIPTION

A multi-service architecture that supports "Any Port Any Service" (APAS) for use in multi-slot, multi-service networking products is described. As will be described in more detail below, software can be invoked to support the desired service type (HDLC/FR/ATM, etc.) while using the common hardware. The software can configure any port for any of the desired service types. In this way, different service types can be supported simultaneously on different ports. Additionally, making use of the common hardware platform simplifies the configuration of the various network interface cards.

By downloading an appropriate software image, the common hardware can be configured to support various services including but not limited to T1/E1 voice application, channelized FR application, unchannelized FR application, T1/E1 ATM application, serial Asynchronous/Bisynchronous mode applications or any combination across the ports, depending on the application and the corresponding software images.

The intended advantages include helping to save in hardware development, testing and qualification time, and helping to reduce costs associated with the training of the "service provider" line of customers, field/support and sales personnel. Further intended advantages include helping to reduce the risks associated with different service/interface types, helping to reduce time-to-market due to savings in efforts at various stages of hardware development, and helping to save in the overall hardware cost due to higher volumes resulting from the use of common hardware across various applications. Additional intended advantages include the benefit to a service provider by requiring only one type of hardware for different network applications and thereby decreasing inventory. This is opposed to requiring multiple types of hardware for different applications. Further, a service provider may be provided with a decreased learning curve on hardware aspects of a platform/product by providing one hardware that can be used for different applications.

Figure 1:
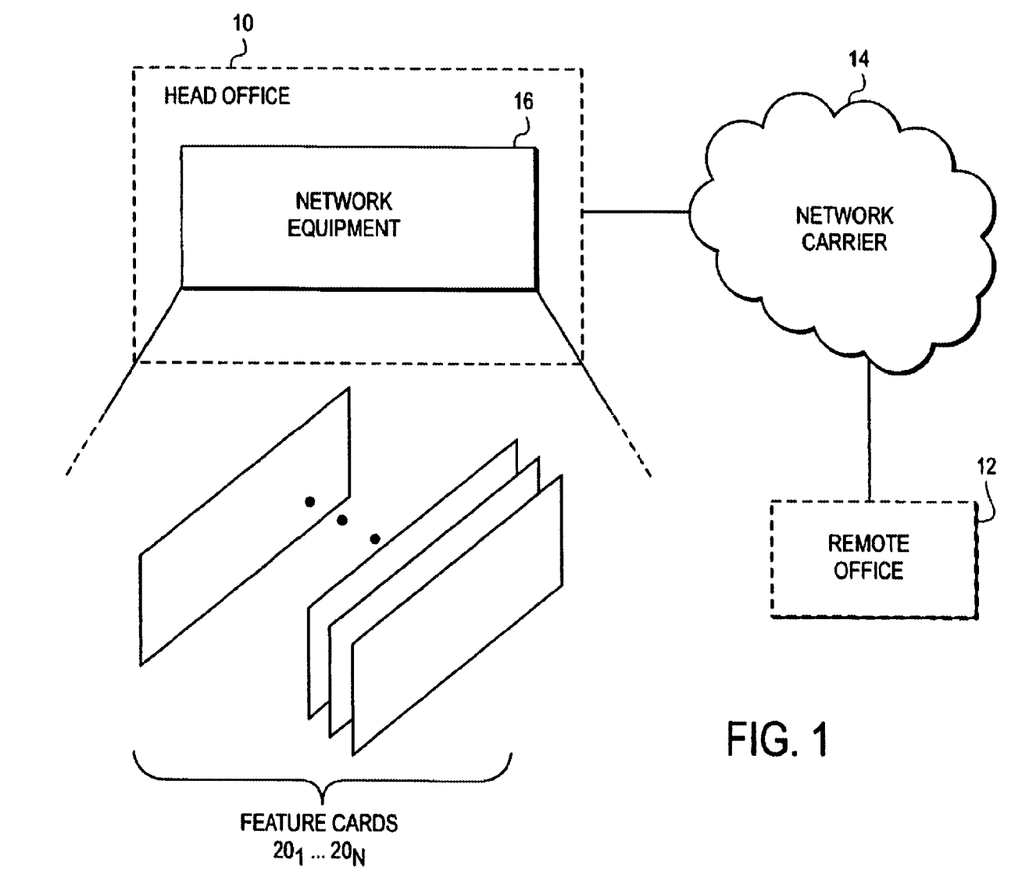
FIG. 1 shows a network diagram.

FIG. 1 is a diagram of one embodiment of a network. The exemplary network connects a head office 10 with at least one remote office 12 through a network carrier 14 such as a wide area network (WAN). A network equipment 16 residing at the head office 10 has several card slots for several feature cards $20_1 \ldots 20_N$. Each feature card 20 has a set of port connectors that is wired or connected to a Public Branch Exchange (PBX) or some network level application. The network carrier 14 is supported by all feature cards $20_1 \ldots 20_N$ and supports transmission through several different services including but not limited to an Asynchronous Transfer Mode (ATM) transmission coming from an ATM service connection and a Frame Relay (FR) service connection.

The network equipment 16 may be implemented with the APAS multi-service architecture to configure any port on a feature card for any desired service type and to allow different service types to be supported simultaneously on different ports.

Figure 2A:
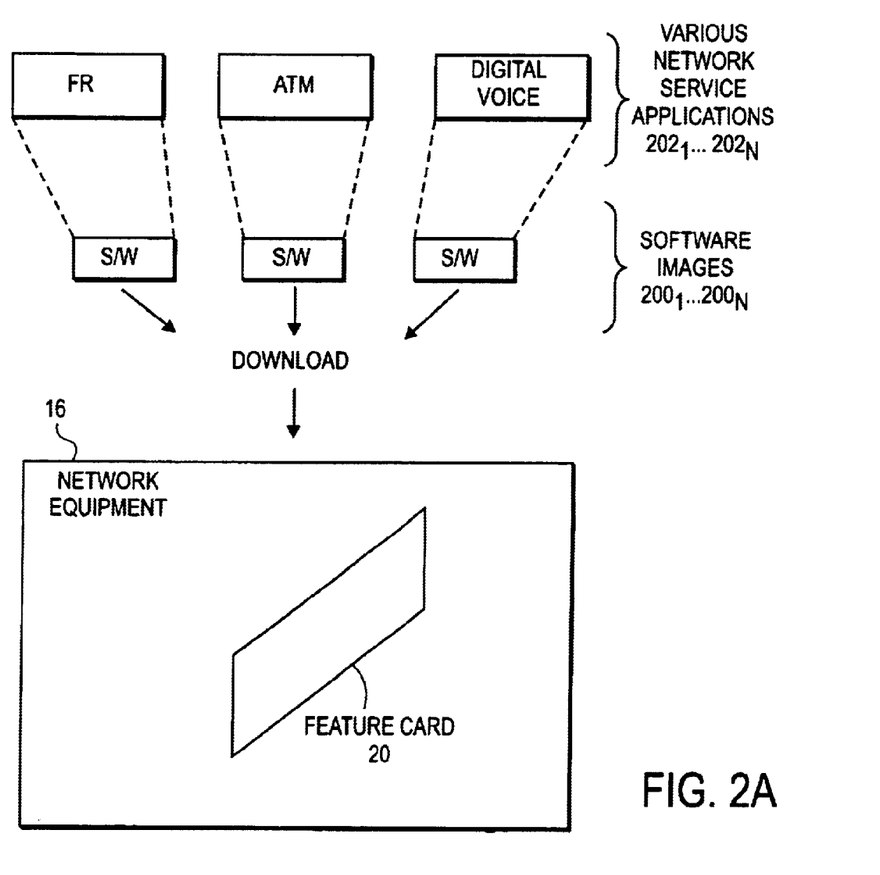
FIG. 2a is a block diagram of one embodiment of an APAS configuration.

FIG. 2a is a block diagram of one embodiment of an APAS configuration. The embodiment is comprised of a feature card 20 of a network equipment 16. The system is also comprised of various software images $200_1 \ldots 200_N$ dependent on a set of network service applications $202_1 \ldots 202_N$. For one embodiment, the applications $202_1 \ldots 202_N$ may be, but are not limited to, an FR application, an ATM application or a digital voice application.

The illustrated system may have one network or multiple networks, and the various components of the network or networks may be deploying an FR service, an ATM service, or a digital voice service. Within the service, there are different types of transmissions including channelized and unchannelized transmissions.

The network equipment 16 may be a modular multi-service access concentrator (MAC) implemented in a multi-slot box chassis with a number of digital signal processors (DSP) and a feature card 20 implemented with an APAS hardware platform architecture.

In order to support different applications $202_1 \ldots 202_N$ such as digital voice, ATM, FR or serial applications, the same feature card 20 may be used or different feature cards $20_1 \ldots 20_N$ may be plugged into different slots and a corresponding software image 200 may be downloaded onto the respective feature cards $20_1 \ldots 20_N$ for a particular application 202. For example, if a card in a slot three is designated to support ATM service, then the software image 200 for ATM service is downloaded onto card three. To process various different applications $202_1 \ldots 202_N$, a corresponding software image 200 is downloaded.

Alternatively, two ports may support a different type of application 202 within the same feature card 20. For this scenario, two different types of software images 200, and 2002 may be run on a processor that supports two different applications $202_1$ and $202_2$.

The software images $200_1 \ldots 200_N$ therefore program the control logic of a feature card 20 differently depending on the network service type to be supported.

Figure 2B:
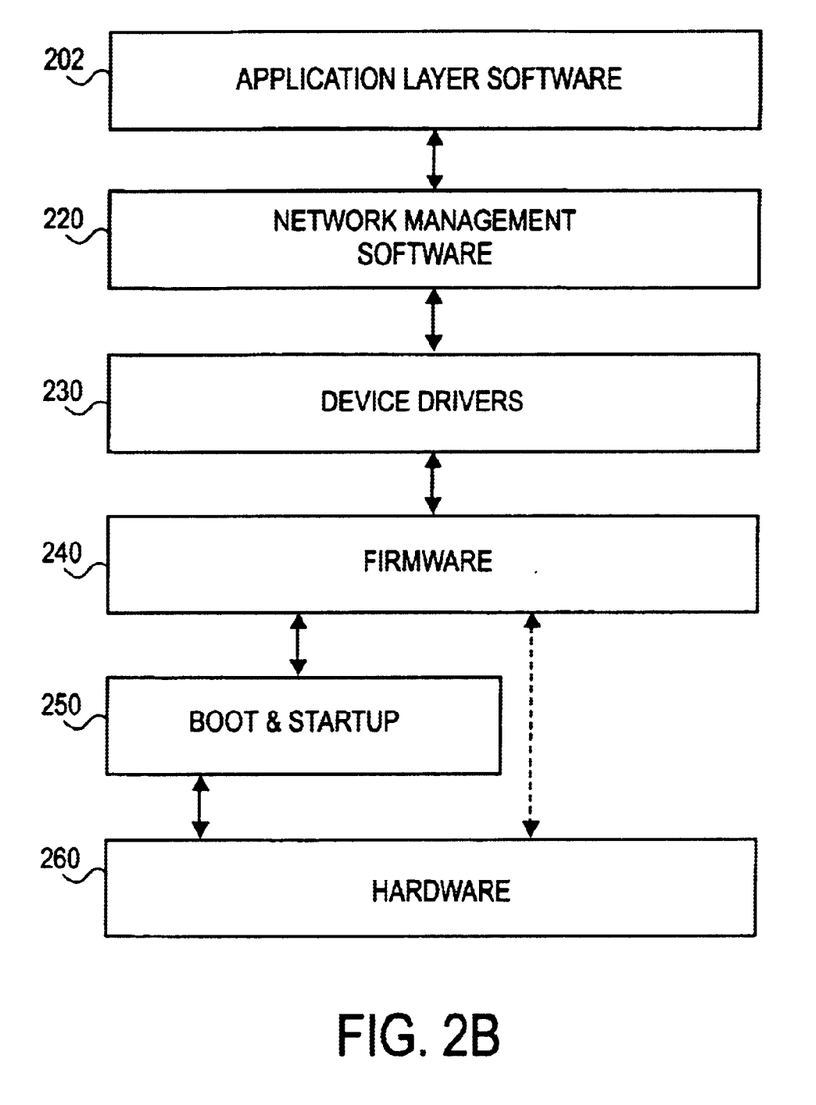
FIG. 2b is a software block diagram of exemplary software components interfacing with an APAS hardware platform.

FIG. 2b is a software block diagram of exemplary software components interfacing with an APAS hardware platform. Application layer software 202 such as Voice over Internet Protocol (IP) or Voice over Asynchronous Transfer Mode (ATM) application software is coupled to network management software 220. The network management software 220 is coupled to various device drivers 230. The device drivers 230 are in turn coupled to firmware 240 which is referred herein as software images $200_1 \ldots 200_N$. The boot and startup software 250 perform initialization of the hardware 260 which is the network equipment 16.

Figure 3:
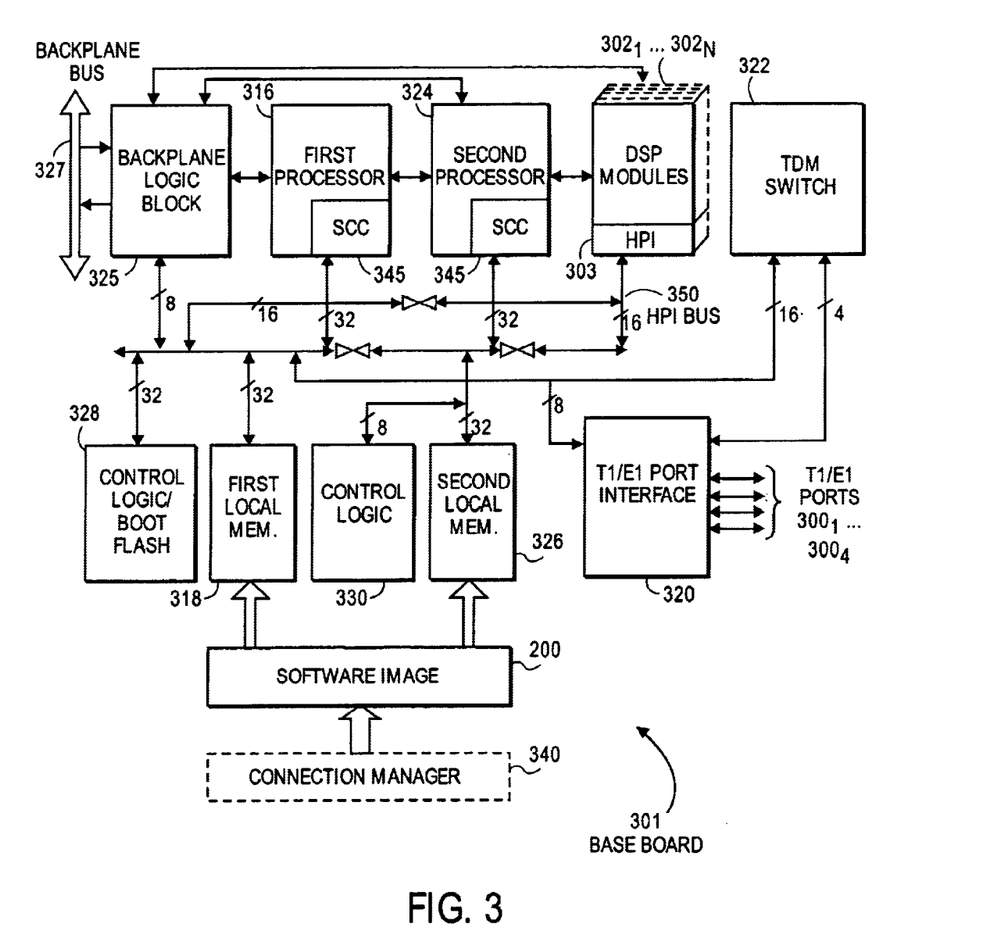
FIG. 3 is a block diagram of one embodiment of an APAS hardware platform.

FIG. 3 is a block diagram of one embodiment of an APAS hardware platform. One embodiment may be implemented with either a single board housing the processors, T1/E1 framers, TDM switch and all related logic and the proper number of DSPs. In the alternative, the proper number of DSPs may be mounted with the associated logic on pluggable modules, while the remaining logic is housed on the base-board.

For one embodiment, the feature card 20 is composed of a base-board 301 and Digital Signal Processor Modules (DSPMs) $302_1 \ldots 302_N$. The base-board 301 houses a first processor 316 and a second processor 324 with their respective associated logic while each DSPM 302 houses a predetermined number (such as up to six) of DSPs with their associated logic. The base-board 301 may support up to four T1/E1 ports $300_1 \ldots 300_4$ for a total of 96/120 channels.

The base-board 301 is implemented with a dual processor such as the MPC860 from Motorola, Inc. of Schaumberg, Ill. It may be noted that the MPC860 is an example and other suitable devices may be used to implement the common hardware.

Additionally, the choice of processors, the number of physical ports, the number of DSPs, and other devices on the base-board 301 are dependent on the required or desired networking applications $202_1 \ldots 202_N$ and performance of the platform. The illustrated exemplary embodiment is one such case supporting a "common hardware" for specific set of requirements.

The first processor 316 may be configured to run the system's boot code and other firmware/software including one or more software image 200. At power-on or on hard reset, the first processor 316 downloads the boot code from boot flash memory 328 to a first local memory 318 such as an SDRAM and executes the boot code from the first local memory 318. The first processor 316 then initializes various on-board resources, such as the T1/E1 port interface 320, TDM switch 322 and other input/output (I/O) devices. Additionally, the first processor 316 maintains the base-board 301 under reset until its initialization of the various peripherals, including the T1/E1 port interface 320 and the TDM switch 322, is complete. Once initialization is complete, the first processor 316 removes the second processor 324 out of reset and allows the second processor 324 to run.

The second processor 324 is responsible for the DSP interface. After being removed out of reset by the first processor 316, the second processor 324 copies code from the first local memory 318 to its local memory 326 (a second local memory such as an SDRAM) and begins executing the code out of the second local memory 326. Further, the second processor 324 initializes the DSP's on the DSP modules $302_1 \ldots 302_N$. The second processor 324 handles the data transfer to/from the DSP's on the DSP modules $302_1 \ldots 302_N$ from/to the second memory 326 and handles various data-centric tasks such as protocol-specific-packetization. For one embodiment, the two processors interact with each other via interrupt-based messaging and/or software mailboxes/semaphores. In an alternate embodiment, the two processors are replaced by a single processor.

The TDM switch 322 under software control (via software images $200_1 \ldots 200_N$) routes the individual timeslots (DSOs) from any TDM port to any other TDM port. This allows routing of voice connections (DSOs) from any given port to any other port on board across the T1/E1 ports $300_1 \ldots 300_4$ in case of 'Voice' applications. For one embodiment, the TDM switch 322 provides sixteen TDM ports in each direction. The spare ports are wired to Serial Communication Controllers (SCCs) 345 (TDM ports 1 and 2) on both processors. The single platform hardware architecture with the TDM switch 322 allows the single platform for use for Voice/ATM/Frame-Relay and other applications with the corresponding software images $200_1 \ldots 200_N$.

T1/E1 port interface 320 is comprised of T1/E1 framers and Line Interface Circuitry (LIUs) and can be integrated (i.e. T1/E1 each framer and LIU integrated as a single unit) or separate. In the ingress direction, the T1/E1 framers perform data and clock recovery, monitor the trunk for alarms, receive serial bit stream from the physical line, perform the framing and other functions and send out the PCM bit stream consisting of individual timeslots to the TDM switch 322. The T1/E1 framers also extract the received clock from the received data. In the egress direction, the PCM bit stream from the TDM switch 322 is processed by the T1/E1 framer and sent out over the T1/E1 physical line.

The DSP modules $302_1 \ldots 302_N$ comprise DSPs with their respective memories and clocking logic. The DSPs run various software algorithms for the required functions, such as different compression-modes, DTMF Tone detection/generation, Fax tone detection and processing, etc. The DSPs receive the serial data from the TDM switch 322. Each DSP processes the data for certain timeslots and interrupts the second processor 324 at the completion of processing. Upon receiving the interrupt, the second processor 324 copies the processed data from proper DSPs to local memory (318 and 326). In the egress direction, the second processor 324 moves the data from local memory (318 and 326) to the proper DSPs and the DSPs process the data to generate serial bit streams. The serial bit streams from the various DSPMs $302_1 \ldots 302_N$ come to the TDM switch 322 and the TDM switch 322 routes the proper timeslots to the proper T1/E1 framers under software control.

The local memory (318 and 326) stores code and data for the processors including software images $200_1 \ldots 200_N$. More specifically, when a new network connection is being configured (such as a "Voice Call Set-Up" or "an ATM VC being set-up" or a "Frame Relay connection (DLCI) set-up"), a connection manager 340 identifies the "type of connection set-up" being requested. The connection manager 340 invokes the proper low-level software/firmware modules (software images $200_1 \ldots 200_N$) which are then downloaded into the local memory (318 and 326). Either memory is accessible by both processors. The processors execute out of their own local memory.

The backplane logic block 325 interfaces the processors with the backplane bus 327. In the ingress direction, the backplane logic block 325 receives data (packets/cells/frames depending on the application and protocols), and transmits them over the backplane to the proper destination. In the egress direction, the backplane logic block 325 receives the data from the backplane (packets/cells/frames) and transmits the data to the processors.

The DSPMs $302_1 \ldots 302_N$ DSPs interface to TDM streams on one interface and to the carrier host router on the other. In the ingress direction, the DSPs take PCM traffic and form Internet Protocol (IP) packets, which are then read by the first processor 316 over an HPI bus 350 in the first local memory 318 and processed further according to the configuration of the corresponding software image 200. In the egress direction, the first processor 316 sends the IP packets to the DSPs on the DSPMs $302_1 \ldots 302_4$ over the HPI bus 350. The DSPs then convert the data to PCM bit streams, which are then routed to the proper T1/E1 framers by the TDM switch 322.

Figure 4:
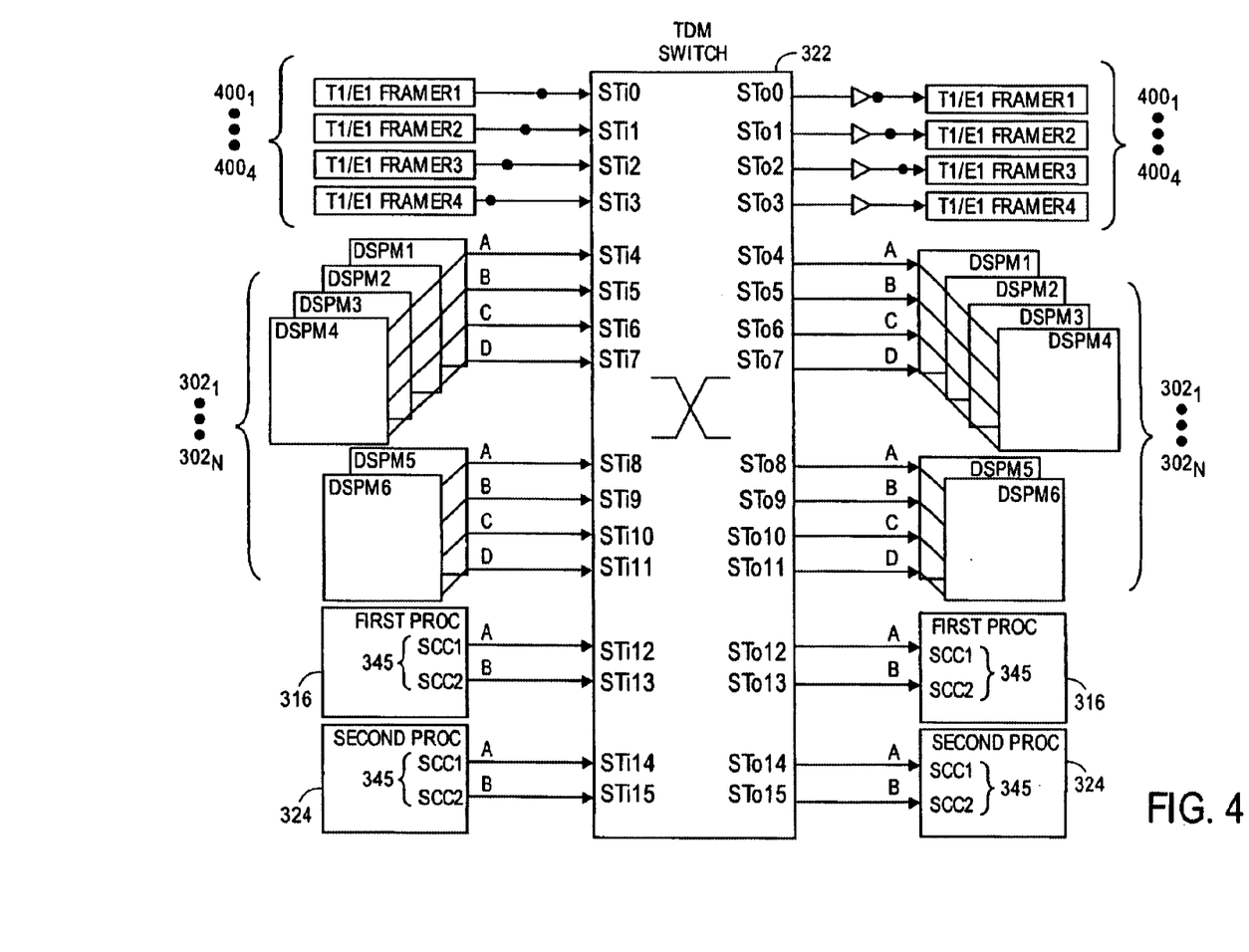
FIG. 4 is an embodiment of the TDM highway.

FIG. 4 is an embodiment of the TDM highway. The APAS hardware platform is implemented with a TDM highway that is connected such that the same hardware can be re-used to support a variety of different network applications (e.g. ATM, FR, voice applications). More specifically, the TDM highway connects the T1/E1 Framers to the TDM for two way communication. Further, the ports on the TDM switch 322 are wired to the DSPMs $302_1 \ldots 302_N$ and to the TDM ports on the SCCs 345 (SCC1, 2) on the processors.

When a new network connection is being configured, a connection manager 340 identifies the type of connection set-up being requested. The connection manager 340 invokes the proper low-level software/firmware modules (software images $200_1 \ldots 200_N$) which are then downloaded into the local memory (318 and 326). The processors (316 and 324) execute the code associated with the software image 200 which in turn programs the TDM switch 322 to correctly manage the desired connectivity (i.e. TDM Switch to DSPMs in case of Voice applications, TDM Switch to SCCs ports in case of FR/ATM applications). The SCC 345 would be connected Non-Muxed Serial Interface (NMSI) ports or TDM ports depending on whether the application needs Unchannelized mode or Channelized mode support, etc.

For example, in the ingress direction, the PCM stream from the T1/E1 framers $400_1 \ldots 400_N$ comes to the TDM switch 322 and the individual timeslots (or "channels") on the PCM streams are routed by the TDM switch 322 per the software image 200 in the programmed manner to appropriate DSPM's $302_1 \ldots 302_N$.

In the egress direction, the serial bit streams from the various DSPM's $302_1 \ldots 302_N$ come to the TDM switch 322 and the TDM switch 322 routes the proper channels to the proper T1/E1 framers $400_1 \ldots 400_4$ as programmed.

In this way, the traffic always passes through the TDM switch 322, and the TDM switch 322 routes the traffic to the appropriate on-board component as programmed by the software image 200 corresponding to the traffic type to be processed. Thus, depending on the application 202, the TDM switch 322 can be properly programmed by a software image 200 to send the data streams for individual (or complete T1/E1 frame) to any port according to the software image 200 being executed (e.g. the ports for the DSPMs $302_1 \ldots 302_N$ or the SCCs 345).

With the above described hardware scheme, some timeslots in a single T1/E1 frame may carry 'Voice' while some others may carry 'data' and the timeslots are routed properly through the TDM switch 322 by programming the TDM switch 322 (e.g. voice-channels routed to the DSPM/s and data-channels to the SCCs) simultaneously, without the need for different types of hardware. Thus, the hardware muxing logic (via the control logic on-board and the TDM switch 322) and the TDM highway's connectivity makes the hardware architecture reusable for a variety of applications, thereby providing significant advantages.

Figure 5:
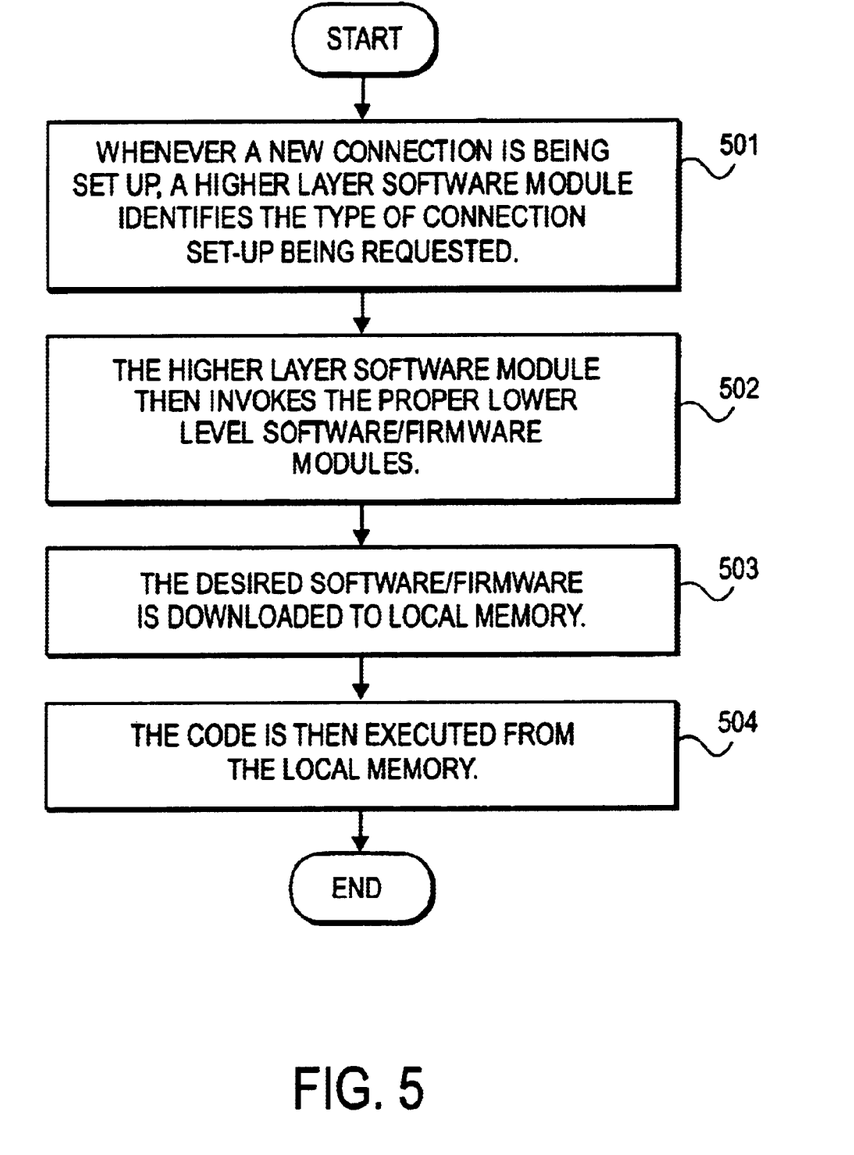
FIG. 5 is a flow chart showing one embodiment of an APAS set up process.

FIG. 5 is a flow chart showing one embodiment of an APAS set up process. In step 501, whenever a new connection is being set-up, a higher layer software module such as a connection manager 340 detects the type of connection set-up being requested. In step 502, the higher layer software module then invokes the proper lower level software/firmware modules such as a software image 200. For example, in order to support multiple types of applications, different software images $200_1 \ldots 200_N$ are made available in the system such as in a common repository, boot flash memory, PCMCIA disk, or downloadable over the Internet.

In step 503, the desired software image 200 is downloaded to the on-board local memory. In step 504, the code associated with the software image 200 is then executed from the local memory and traffic is processed by the processors according to its corresponding software image 200. For example, the TDM switch 322 routes traffic according traffic type as programmed by the corresponding software image 200 (e.g. TDM Switch to DSPMs in case of Voice applications, TDM Switch to SCCs ports in case of FR/ATM applications). Once a particular type of software image 200 is resident in the local memory (318 and 326), for subsequent connection-setup of similar type (Voice/ATM/FR, etc.) the code execution simply continues from the local memory (318 and 326) directly.

What has been described is a method and apparatus for a multi-service architecture with "Any Port Any Service" (APAS) hardware platform. A single piece of hardware is capable of supporting various different software or individual software images related to a particular application. The software image simply needs to be downloaded and is processed by the hardware common across various applications.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A method for a single card to support multiple types of network service, comprising:

initializing the card, after a reset, by executing initialization software stored in a first memory with a first processor, the first memory and the first processor located on the card:

detecting a first request to establish a first network connection that flows through the card;

determining a first type of network service used by the first network connection;

downloading in response to the determining, to second memory located on the card, software that is specific to the first type of network service;

executing the software to process traffic over the first network connection according to the first type of network service, the software stored in the second memory and the executing performed with a second processor, the second memory and the second processor located on the card;

detecting a second request to establish a second network connection that flows through the card;

determining a second type of network service used by the second network connection;

downloading in response to the determining a second type of network service, to the second memory located on the card, software that is specific to the second type of network service; and executing the software that is specific to the second type of network service to process traffic over the second network connection according to the second type of network service, the software that is specific to the first type of network service being executed simultaneously with the software that is specific to the second type of network service so that the card can simultaneously process traffic over the first connection and the second connection according to the first and second service types, respectively, the software that is specific to the second type of network service also stored in the second memory and the executing of the software that is specific to the second type of network service also performed with the second processor, neither the first nor the second processors being digital signal processors (DSPs).

2. The method of claim 1 further comprising configuring a switch to direct the traffic that is associated with the first network connection, after being received from a physical line that transported it, to the second processor that performs the executing of the software that is specific to the first type of network service.

3. The method of claim 2 wherein the second processor has access to the memory that the software that is specific to the first type of network service was downloaded into.

4. The method of claim 1 wherein at least one of the types of networking service is a voice transportation service.

5. The method of claim 1 wherein at least one of the types of networking service is an Asynchronous Transfer Mode (ATM) service.

6. The method of claim 1 wherein at least one of the types of networking service is a Frame Relay service.

7. A method, comprising:

initializing a card, after a reset, by executing initialization software stored in a first memory with a first processor, the first memory and the first processor located on the card, the first processor not a digital signal processor (DSP):

downloading a first software routine to the card so that the card can execute the first software routine, the downloading of the first software routine being in response to a connection of a first service type being attempted through the card, the first software routine being specific to the first type of networking service so that the card can provide the first type of networking service over a physical line that emanates from the card;

downloading a second software routine to the card, the downloading of the second software routine being in response to a connection of a second service type being attempted through the card, the card also able to execute the second software routine, the second software routine being specific to the second type of networking service so that the card can simultaneously provide the second type of networking service over the physical line with the first type of networking service; and, executing the first and second software routine so as to simultaneously provide the first and second types of networking service, the executing being performed by a second processor with the first and second routines stored in a second memory, the second processor and second memory located on the card, the second processor not a digital signal processor (DSP).

8. The method of claim 7 wherein the physical line transports framed traffic.

9. The method of claim 8 wherein said physical line is a T1/E1 physical line.

10. The method of claim 7 wherein one of the types of network service is a voice transportation service.

11. The method of claim 10 wherein another one of the types of network service is an ATM service.

12. The method of claim 10 wherein another one of the types of service is a Frame Relay service.

13. The method of claim 7 further comprising configuring a switch that is located on the card to route traffic between a line interface that is located on the card and the second processor.

14. A card, comprising:
   a) an interface to a physical line, the interface further comprising a line interface unit and a framer;
   b) a plurality of digital signal processors (DSPs) and a plurality of processors that are not DSPs coupled to local memory resources, at least one of said processors that are not DSPs and the portion of said local memory resources coupled to said at least one of said processors to simultaneously execute a plurality of service specific software routines that are each downloaded to said local memory resources as a consequence of connection manager software deciding the card is to simultaneously provide a plurality of different networking service types over the physical line; and,
   c) a switch coupled to the interface to receive ingress traffic from the interface, the switch to route the traffic toward the processors.

15. The card of claim 14 wherein one of the types of networking service further comprises a voice transportation service.

16. The card of claim 15 wherein the plurality of processors further comprise a plurality of digital signal processors that help to provide the voice transportation service.

17. The card of claim 14 wherein one of the types of networking service further comprises an ATM service.

18. The card of claim 14 wherein one of the types of networking service further comprises a Frame Relay service.

19. A card, comprising:
   a) first means for interfacing to a physical line;
   b) second means for storing a plurality of downloaded service specific software routines for at least two different types of service, said second means further comprising a first memory and a second memory;
   c) third means for simultaneously executing said plurality of downloaded service specific software routines if the card is to simultaneously provide a plurality of different networking service types over the physical line, said third means further comprising a first processor and a second processor, said first processor coupled to said first memory, said second processor coupled to said second memory, neither of said first and second processors being digital signal processors (DSPs); and,
   d) fourth means for receiving ingress traffic from the first means and routing the ingress traffic to the third means.

20. The card of claim 19 wherein one of the types of networking service further comprises a voice transportation service.

21. The card of claim 19 wherein one of the types of networking service further comprises an ATM service.

22. The card of claim 19 wherein one of the types of networking services further comprises Frame Relay.

23. A system comprising:
   i) a card comprising:
      a) a line interface unit coupled to a framer;
      b) a first processor to at least run said card's boot code, said first processor not a digital signal processor (DSP);
      c) a second processor, said second processor not a digital signal processor (DSP);
      d) a plurality of digital signal processors (DSPs);
      e) local memory resources coupled to said first and second processors and said plurality of DSPs, said second processor to transfer data between said plurality of DSPs and said local memory resources, said local memory resources to be downloaded into with individual software items, said individual software items being specific to a different type of networking service, said card to simultaneously execute each of said downloaded software items, said card capable of simultaneously supporting different types of networking service over a line coupled to said line interface unit;
      ii) connection management software to trigger the downloading of each software item that is downloaded in response to, for each software item that is downloaded, a realization that a connection characterized by a network service type that the software item is designed to help implement is to be supported by said card.

24. The system of claim 23 further comprising a TDM switch electrically coupled between said framer and said local memory resources.

25. The system of claim 24 wherein said TDM switch is under software control.

26. The system of claim 23 further comprising a boot flash memory coupled to said first processor.

27. The system of claim 23 wherein said DSPs can form IP packets from ingress PCM traffic.

28. The system of claim 23 wherein said DSPs can form egress PCM traffic from IP packets.

29. A method, comprising:
   initializing a card with a first processor that is not a digital signal processor (DSP):
   deciding that said card is to provide a networking service of a first type over a physical line;
   downloading to said card a first software routine that is specific to said networking service of said first type;
   deciding that said card is to provide a networking service of a second type over said physical line;
   downloading to said card a second software routine that is specific to said networking service of said second type; and,
   simultaneously providing said first and second types of networking service over said physical line by:
   concurrently executing said software routines with a second processor on said card, wherein said second processor is not a digital signal processor (DSP);
   and by,
   concurrently operating a plurality of DSPs located on said card.

30. The method of claim 29 wherein said downloading is to memory resources on said card.

31. The method of claim 30 further comprising configuring a switch to route ingress traffic from said physical line toward said processor.

32. The method of claim 30 wherein at least one of said types of networking service is a voice transportation service.

33. The method of claim 30 wherein at least one of said types of networking service is an ATM service.

34. The method of claim 30 wherein at least one of said types of networking service is Frame Relay service.

35. An apparatus, comprising:
   means for initializing a card with a first processor that is not a digital signal processor (DSP):
   means for deciding that said card is to provide a networking service of a first type over a physical line;
   means for downloading to said card a first software routine that a specific to said networking service of said first type;
   means for deciding that said card is to provide a networking sevice of a second type over said physical line;
   means for downloading to said card a seond software routine that is specific to said networking service of said second type; and, means for simultaneously providing said first and second types of networking service over said physical line by:

concurrently executing said software routines with a second processor on said card, wherein said second processor is not a digital signal processor (DSP); and by, simultaneously operating a plurality of DSPs located on said card.

36. The apparatus of claim 34 wherein said downloading is to memory resources on said card.

37. The apparatus of claim 34 further comprising means for configuring a switch to route ingress traffic from said physical line toward said processor.

38. The apparatus of claim 34 wherein at least one of said types of networking service is a voice transportation service.

39. The apparatus of claim 34 wherein at least one of said types of networking service is an ATM service.

40. The apparatus of claim 34 wherein at least one of said types of networking service is Frame Relay service.

41. A machine readable medium containing instructions which when executed by a processing system upon which a connection manager runs, cause said connection manager or perform a method, said method comprising:

in order to simultaneously provide first and second types of networking service over a card's physical line:

deciding that said card is to provide a networking service of a first type over said physical line;

downloading to said card a first software routine that is specific to said networking service of said first type;

deciding that said card is to provide a networking service of a second type over said physical line; and, downloading to said card a second software routine that is specific to said networking service of said second type said downloading to permit said card to:

concurrently execute said software routines with a processor on said card, wherein said processor is not a digital signal processor (DSP); and to, concurrently operate a plurality of DSPs located on said card, wherein said card is initialized by a second processor that is not a DSP.

42. The machine readable medium of claim 41 wherein at least one of said types of networking service is a voice transportation service.

43. The machine readable medium of claim 40 wherein at least one of said types of networking service is an ATM service.

44. The machine readable medium of claim 40 wherein at least one of said types of networking service is Frame Relay service.

* * * * *